United States Patent
Ruvini et al.

(10) Patent No.: US 8,285,721 B2
(45) Date of Patent: Oct. 9, 2012

(54) MAPPING ITEM RECORDS TO PRODUCT RECORDS

(75) Inventors: Jean-David Ruvini, Los Gatos, CA (US); Badrul M. Sarwar, San Jose, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 461 days.

(21) Appl. No.: 12/568,600

(22) Filed: Sep. 28, 2009

(65) Prior Publication Data

US 2010/0082592 A1 Apr. 1, 2010

Related U.S. Application Data

(60) Provisional application No. 61/101,126, filed on Sep. 29, 2008.

(51) Int. Cl.
*G06F 17/30* (2006.01)
(52) U.S. Cl. ............... 707/740; 707/758; 707/E17.125; 705/26.7
(58) Field of Classification Search ............ 707/740, 707/755, 776, 758
See application file for complete search history.

(56) References Cited

U.S. PATENT DOCUMENTS

| | | | | |
|---|---|---|---|---|
| 7,305,363 | B1* | 12/2007 | Sandholm et al. | 705/37 |
| 7,389,294 | B2* | 6/2008 | Kotas et al. | 707/781 |
| 8,065,326 | B2* | 11/2011 | Li et al. | 707/776 |
| 2005/0240507 | A1* | 10/2005 | Galen et al. | 705/37 |
| 2006/0224954 | A1* | 10/2006 | Chandler et al. | 715/520 |
| 2008/0091549 | A1* | 4/2008 | Chang et al. | 705/26 |

OTHER PUBLICATIONS

McGrath, How to Run a Test Auction, Dec. 11, 2005, pp. 1-3.*

* cited by examiner

*Primary Examiner* — Rehana Perveen
*Assistant Examiner* — Albert Phillips, III
(74) *Attorney, Agent, or Firm* — Schwegman Lundberg & Woessner, P.A.

(57) ABSTRACT

An item record in an item database contains an item description generated by a seller of an item. A server machine is configured to access the item database, analyze the item description, and extract descriptive information by inferring an attribute and a corresponding attribute value from the item description. The attribute and its attribute value constitute an attribute-value pair. The server machine uses the attribute-value pair to map the item record to a product record stored in a product database. The mapping of the item record to the product record is based on comparing the attribute-value pair of the item record to a reference attribute-value pair in the product record to identify the product record. The mapping is performed upon detection of a match between the attribute-value pairs.

19 Claims, 13 Drawing Sheets

MAPPING ITEM RECORDS TO PRODUCT RECORDS

CROSS-REFERENCE TO RELATED APPLICATIONS

This application claims the benefit of U.S. Provisional Application No. 61/101,126, filed Sep. 29, 2008, entitled "CATALOG SYSTEM," the disclosure of which is incorporated herein by reference in its entirety.

TECHNICAL FIELD

The subject matter disclosed herein generally relates to information management. Specifically, the present disclosure addresses systems and methods of mapping item records to product records.

BACKGROUND

Databases may be used to store information regarding a group of items. Such a database may be called an item database. An item database typically stores multiple records, and each record contains information about a specific item. For example, an item database that represents a fleet of trucks may store a record for a first truck having one license plate number and another record for a second truck having another license plate number. As another example, an item database within a network-based publication or commerce facility (e.g., an online auction website) may store one record for a digital camera available for sale and another record for a diamond ring available for sale. A record for a specific item may be called an item record.

An item record within an item database generally contains identifying information that identifies a corresponding item and indicates that the item record is for that item. Frequently, an item record also contains descriptive information that describes the item with respect to one or more attributes. For example, a vehicle identification number may constitute identifying information in an item record for a truck, while a name of the truck's manufacturer may constitute descriptive information in that item record. As another example, an item record for a digital camera may store a listing number as identifying information and a model number as descriptive information.

BRIEF DESCRIPTION OF THE DRAWINGS

Some embodiments are illustrated by way of example and not limitation in the figures of the accompanying drawings in which.

DETAILED DESCRIPTION

Figure 1:
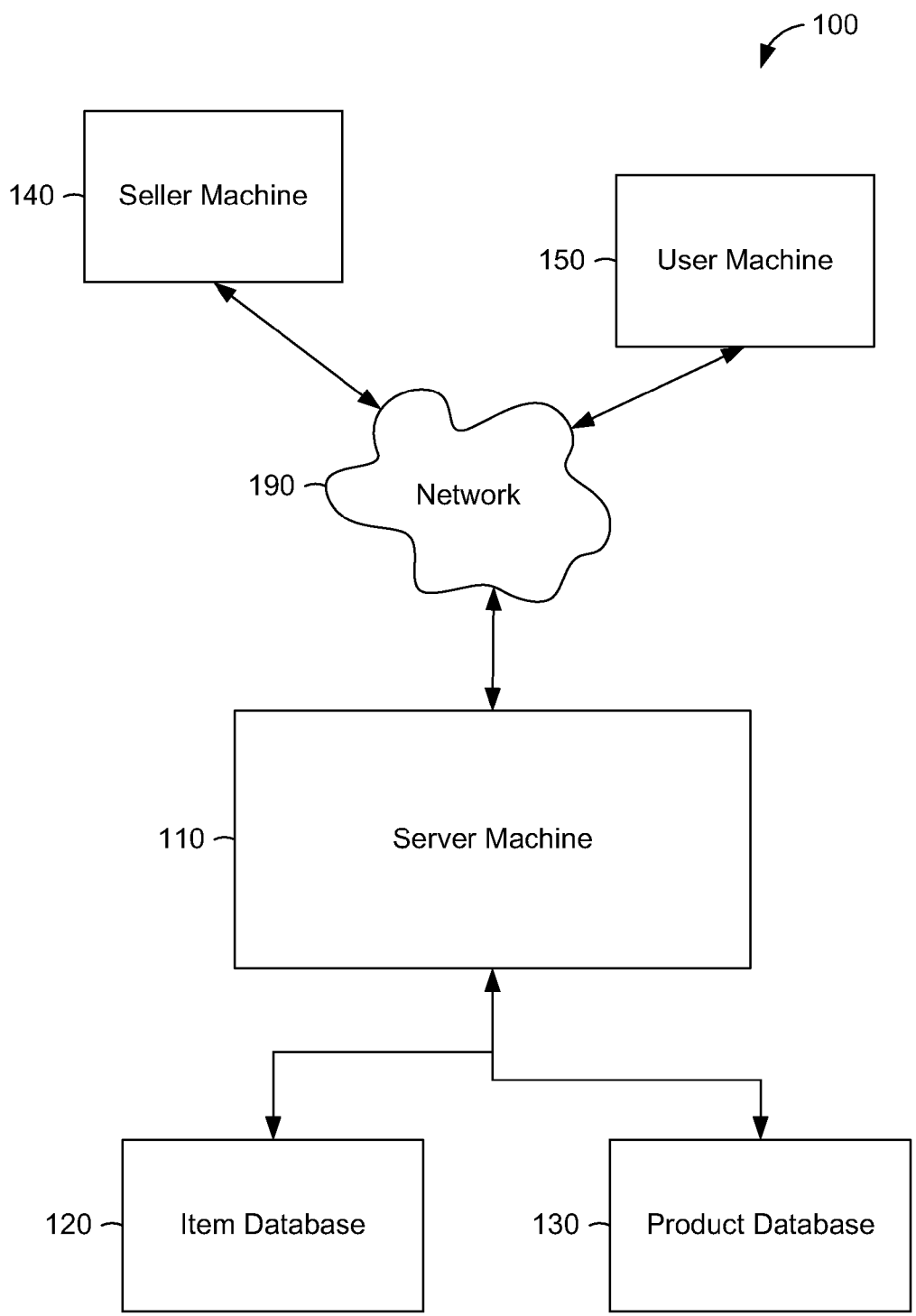
FIG. 1 is a block diagram illustrating components of a system to map item records to product records, according to some example embodiments.

Example systems and methods are directed to mapping an item record to a product record. Examples discussed herein merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of some example embodiments. It will be evident to one skilled in the art, however, that the present subject matter may be practiced without these specific details.

An item database stores an item record for an item. The item record contains an item description, which may be generated by a seller of the item or received from the seller of the item (e.g., from a seller machine via a network). A server machine is configured to access the item database. An analysis module of the server machine analyzes the item description and extracts some descriptive information by inferring an attribute-value pair based on the item description. In other words, the analysis module infers an attribute and a corresponding attribute value from the item description. The attribute and its attribute value constitute the attribute-value pair. The analysis module includes the attribute-value pair in the item record.

A mapping module of the server machine uses the attribute-value pair to map the item record to a product record stored in a product database. This may be performed by including a reference to the product record in the item record. The product database is accessible by the server machine and stores one or more product records. Each product record includes a reference attribute-value pair. The mapping of the item record to the product record is based on comparing the attribute-value pair of the item record to the reference pair in the product record to identify the product record. The mapping is performed upon detection of a match between the attribute-value pairs.

The item record may contain multiple attribute-value pairs inferred from the item description, and the product record may contain multiple reference pairs. The mapping, accordingly, may be based on a confidence level calculated from the number of attribute-value pairs in the item record that match a reference pair in the product record. Such a calculation need not accord equal weight to all attribute-value pairs.

In some example embodiments, each product record corresponds to an end node of a decision tree, or stated differently, each product record corresponds to a path from the end node to the root node of the decision tree. The mapping of the item record to the product record is based on analyzing the attribute-value pair of the item record using the decision tree (e.g., by traversing the decision tree to an end node) to identify the product record.

The mapping of the item record to the product record may facilitate interaction between the server machine and a user (e.g. a user using a user machine connected to the server machine via a network). A search module of the server machine receives search criteria from the user. The search criteria include at least the attribute value of the attribute-value pair inferred from the item description and stored in the item record. The search module identifies item records that satisfy the search criteria and presents the item records to the user, based on a product record that is mapped to the item records. The item records may be arranged using the product record (e.g., grouped according to the product record, or displayed in association with the product record). The search module may present the item records as specimens of the product record (e.g., as examples or instances of the product record).

Additional methodologies and structural features are discussed below in reference to one or more figures of the accompanying drawings.

FIG. 1 is a block diagram illustrating components of a system 100 to map item records to product records, according to some example embodiments. The system 100 includes a server machine 110, an item database 120, a product database 130, a seller machine 140, a user machine 150, and a network 190. The server machine 110 is connected to the item database 120 and to the product database 130. The item database 120 and the product database 130 are shown as separate databases connected to the server machine 110. In some example embodiments, however, the item database 120 and the product database 130 are portions of the same database. Furthermore, either or both of the item database 120 and the product database 130 may be connected directly to the network 190.

The server machine 110 is also connected via the network 190 to the seller machine 140 and to the user machine 150. In some example embodiments, the seller machine 140 and the user machine 150 are combined into a single machine. For example, a seller may also be a user and accordingly may use the same machine as both the seller machine 140 and the user machine 150. For purposes of visualization, either or both of the seller and the user may be contemplated as human. However, either or both may be a machine (e.g., a software-configured computer functioning as the seller, the user, or both).

The network 190 may be any network that enables communication between machines. The network 190 may be a public network (e.g., the Internet), a private network, a wired network, a wireless network, a cellular network, or any combination thereof.

Figure 2:
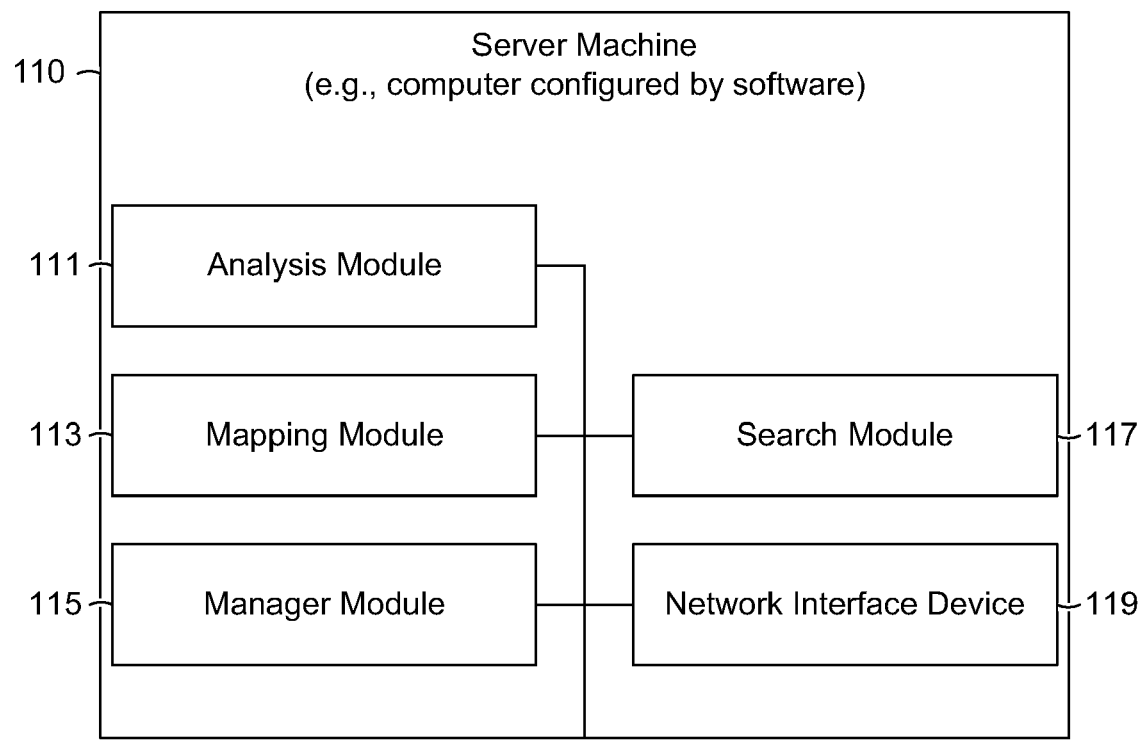
FIG. 2 is a block diagram illustrating components of a server machine to map item records to product records, according to some example embodiments.

FIG. 2 is a block diagram illustrating components of the server machine 110, according to some example embodiments. The server machine 110 may be a computer system (see FIG. 13) configured by software to perform any one or more of the methodologies described herein. As shown, the server machine 110 includes an analysis module 111, a mapping module 113, a manager module 115, a search module 117, and a network interface device 119, all configured to communicate with each other. As discussed in greater detail below with respect to FIG. 13, all modules described herein may be hardware-implemented. The network interface device 119 is a hardware device (e.g., a network adapter) that enables the server machine 110 to communicate via the network 190.

Figure 3:
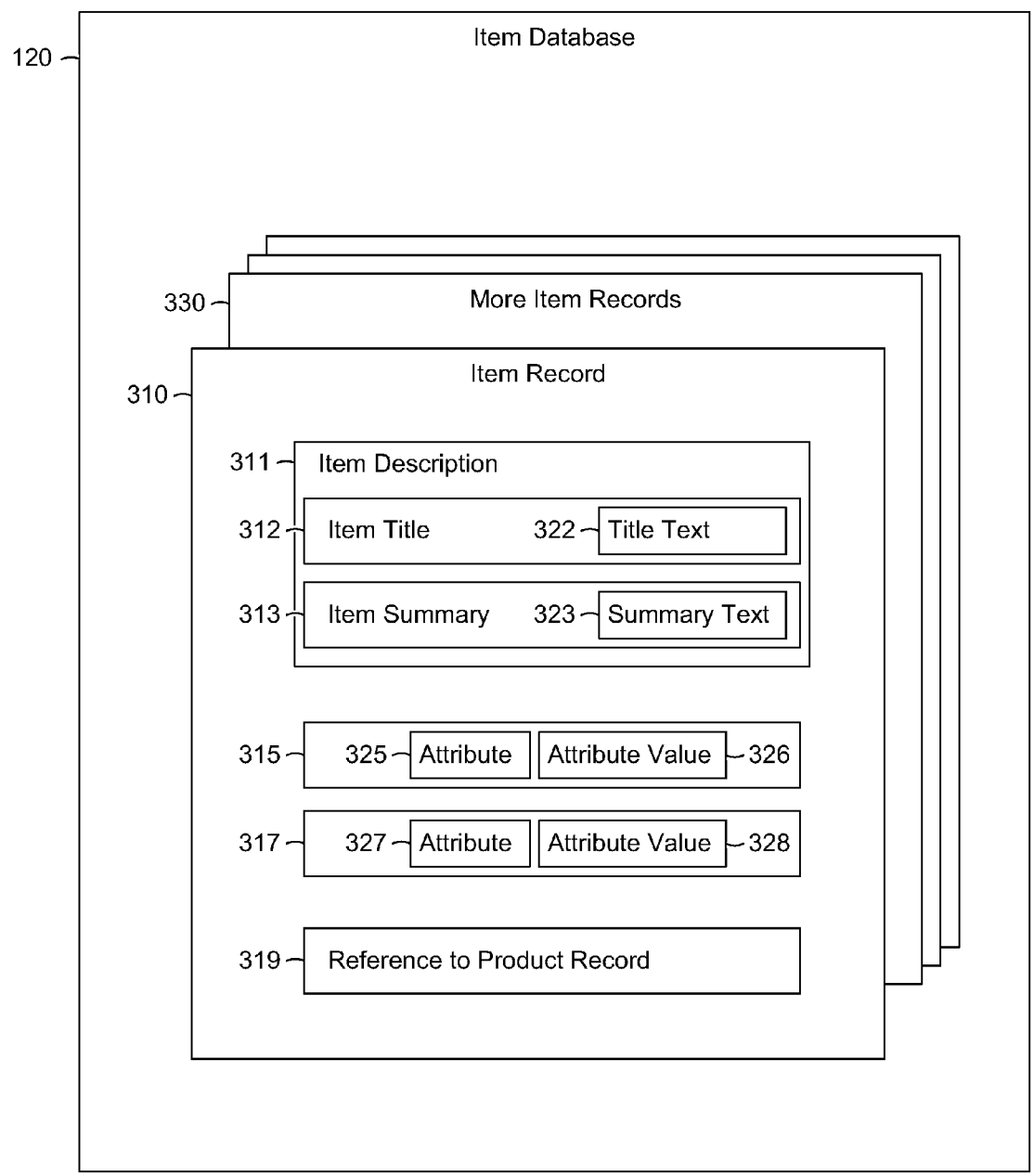
FIG. 3 is a diagram illustrating an item database, according to some example embodiments.

FIG. 3 is a diagram illustrating the item database 120, according to some example embodiments. The item database 120 stores an item record 310, as well as more item records 330. The item database 120 may be implemented as any kind of database that stores one or more records (e.g., item record 310). For example, the item database 120 may be implemented using a relational database, a spreadsheet, a triple store, a single data file, or any combination thereof.

The item record 310 includes an item description 311. The item description 311 includes an item title 312 and an item summary 313. The item description 311 may be any kind of description that describes the item corresponding to the item record 310. For example, the item description 311 may be a textual description, an audio description, an image of the item, a video of the item, a three-dimensional virtual model of the item, or any combination thereof. In some example embodiments, the item title 312 contains title text 322, and the item summary 313 contains summary text 323. The title text 322 may be of any length, and the summary text 323 may be of any length. For example, the title text 322 may contain the following text: "Sony Cyber-Shot DSC-N1 Digital Camera 8.1 MP 4770," and the summary text 323 may contain the following text:

This AS IS auction is for a Sony Cyber-Shot DSC-N1 Digital point and shoot Camera with 8.1 Mega Pixels and 3X optical zoom. This camera has a few scratches around it and some minor paint loss. The LCD screen is smudged up but could probably be cleaned off. There is no battery or charger with this camera. Therefore could not be tested. Being sold AS IS, best for parts or repair.

The item record 310 also includes one or more attribute-value pairs 315 and 317. As shown, a first attribute-value pair 315 includes a first attribute 325 and a corresponding first attribute value 326. The first attribute 325 may be any identifier that identifies an attribute of the item corresponding to the item record 310. For example, the first attribute 325 for a digital camera may be "brand," "model," or "resolution." The first attribute value 326 is the corresponding value for the first attribute 325, with respect to the item. For example, if the first attribute 325 for the digital camera is "brand," the first attribute value 326 for the digital camera may be "Sony," "Panasonic," or "Canon." The first attribute-value pair 315 may use a text character to separate the first attribute 325 from the first attribute value 326. For example, the first attribute-value pair 315 may be stored in the item record 310 as "brand: Sony," "brand/Sony," or "brand↑Sony." As shown, a second attribute-value pair 317 includes a second attribute 327 and its corresponding second attribute value 328.

The item record 310 may also include a reference 319 to a product record. The reference 319 may be included in the item record 310 as a result of the mapping of the item record 310 to a product record. The item record 310 may be mapped to more than one product record, and the item record 310 may therefore store more than one reference (e.g., reference 319 to one product record, plus a second reference to a second product record). The reference 319 may be a pointer, a locator, an identifier, or any combination thereof, that creates a correspondence between the item record 310 and a mapped product record. In some example embodiments, the item record 310 may include more than one reference (e.g., reference 319 to a product record). For example, the item record 310 may include an additional reference to a seller identifier that identifies the seller of the item.

Figure 4:
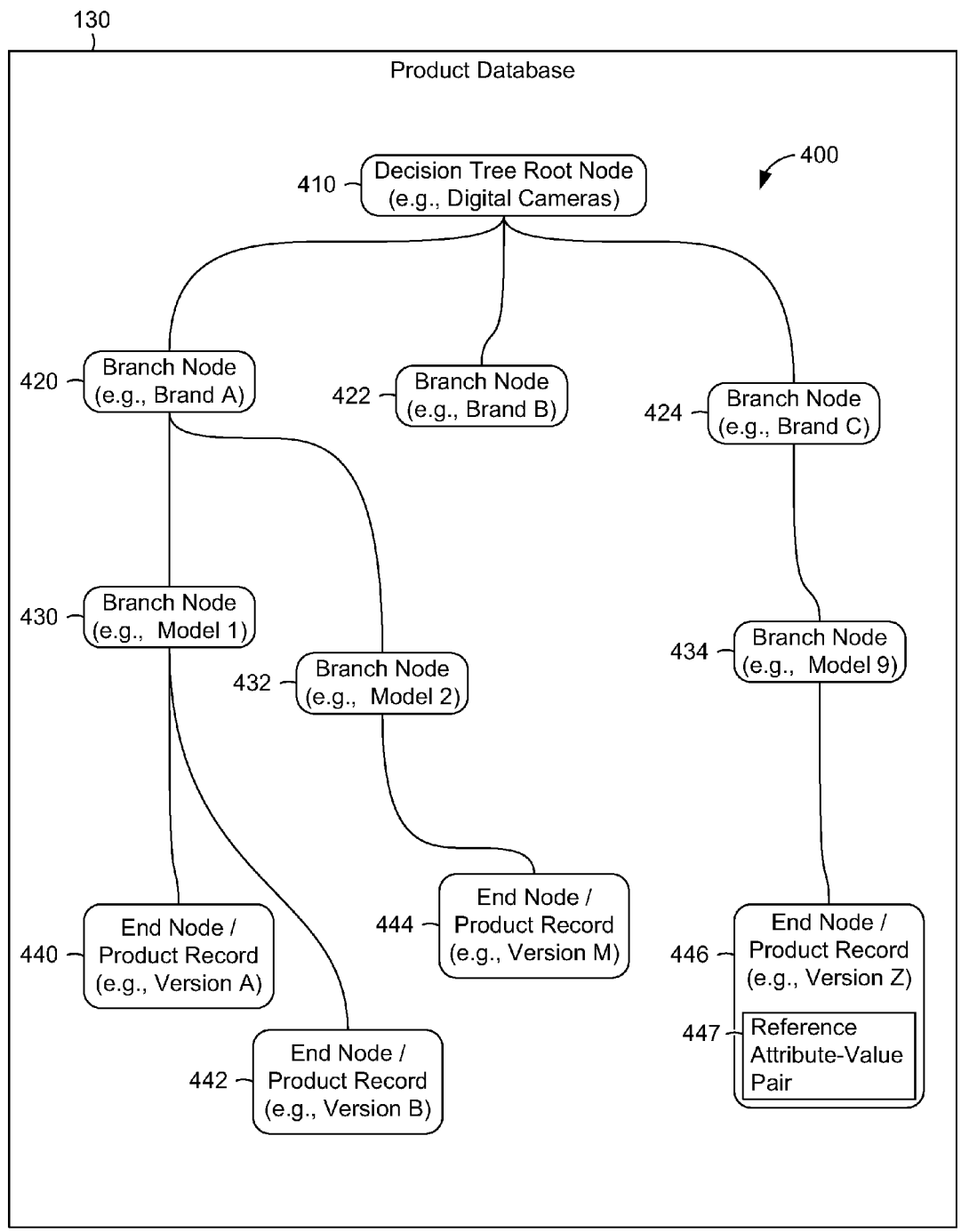
FIG. 4 is a diagram illustrating a product database, according to some example embodiments.

FIG. 4 is a diagram illustrating the product database 130, according to some example embodiments. The product database 130 stores product records 440-446. The product records 440-446 correspond to end nodes of a decision tree 400, or stated another way, correspond to paths within the decision tree 400, each path beginning at a root node and terminating at an end node (e.g., a leaf node). The decision tree 400 is a data structure having multiple nodes. As shown, the decision tree 400 includes a root node 410, branch nodes 420-434, and end nodes 440-446). The root node 410 is a data record representative of an identifier for the decision tree 400 and may contain the identifier (e.g., "Digital Cameras").

Branch nodes 420-424 are data records that define paths from the root node 410 to one or more end nodes (e.g., end nodes 440-446) within the decision tree 400. In the example embodiment shown in FIG. 4, three top-level branch nodes 422-424 are representative of brand identifiers (e.g., "Brand A," "Brand B," and "Brand C"). According to some example embodiments, one or more branch nodes identify various manufacturers of products. For example, "Brand A" may be "Sony;" "Brand B" may be "Panasonic;" and "Brand C" may be "Canon."

Branch nodes 430-434 are data records that further define paths from the root node 410 to one or more end nodes (e.g., end nodes 440-446). According to the example embodiment shown in FIG. 4, three branch nodes 430-434 represent model identifiers (e.g., "Model 1," "Model 2," and "Model 9"). According to some example embodiments, branch nodes identify product lines from the various manufacturers of products. As an example, "Model 1" may be "Cybershot;" "Model 2" may be "Mavica;" and "Model 9" may be "EOS Rebel."

Although two layers of branch nodes are shown, nothing limits the decision tree 400 to only two layers of branch nodes. Decision tree 400 may have any number of branch nodes, arranged in any number of layers, and paths to end nodes may have any level of sophistication.

End nodes 440-446 are product records, which are data records that represent product identifiers (e.g., "Version A," "Version B," "Version M," and "Version Z"). According to some example embodiments, product records identify particular products within the product lines of the various manufacturers. For example, "Version A" may be "DSC-H10 8.1 Megapixel"; "Version B" may be "DSC-W230 12.1 Megapixel;" "Version M" may be "FD200 2 Megapixel;" and "Version Z" may be "T1i 15.1 Megapixel." As shown, the end nodes 440-446 are also product records. In some example embodiments, however, an end node and its corresponding product record are separate data structures (e.g., separate data structures referencing each other), which may be stored in separate databases, the combination of these databases constituting the product database 130.

In some example embodiments, a product record 446 includes a reference attribute-value pair 447. Similar to other attribute-value pairs (e.g., attribute-value pair 315) discussed above, the reference attribute-value pair 447 includes a reference attribute (not shown) and a reference attribute value (not shown). If the attribute-value pair 315 of the item record 310 matches the reference attribute-value pair 447 of the product record 446, then the item record 310 is a candidate for mapping to the product record 446, and such a mapping may be performed based on the match. According to certain example embodiments, an exact match is not required, because fuzzy logic techniques are applied to determine near matches, which may be used for the same purpose.

Figure 5:
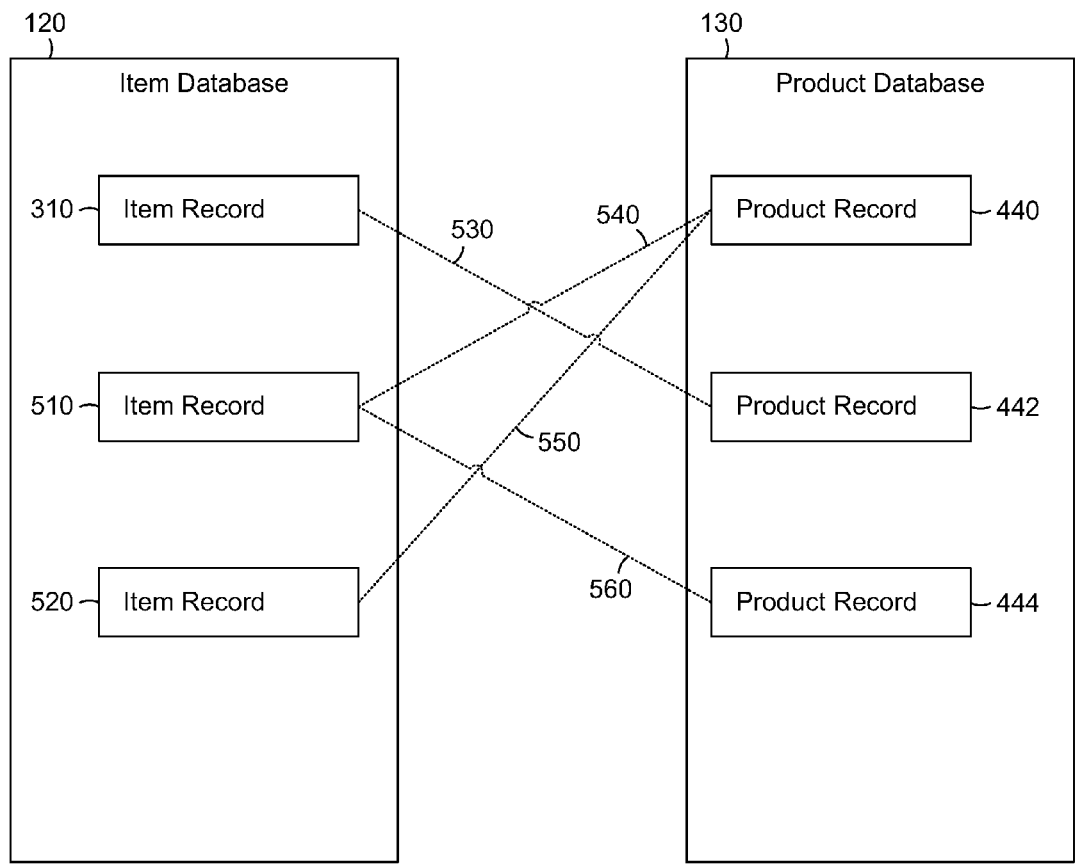
FIG. 5 is a diagram illustrating mappings between item records and product records, according to some example embodiments.

FIG. 5 is a diagram illustrating mappings between item records and product records, according to some example embodiments. The item database 120 contains three item records 310, 510, and 520. The product database 130 contains three product records 440, 442, and 444. An item record 310 is mapped to a product record 442, as shown by a mapping 530. The mapping 530 is implemented by including a reference (e.g., reference 319) in the item record 310. In some example embodiments, the mapping 530 may be bidirectional. For example, the product record 442 may include a reference to the item record 310.

According to various example embodiments, an item record 510 may be mapped to multiple product records 440 and 444, as shown by mappings 540 and 560. Similarly, in certain example embodiments, multiple item records 510 and 520 may be mapped to a product record 440, as shown by mappings 540 and 550.

Figure 6:
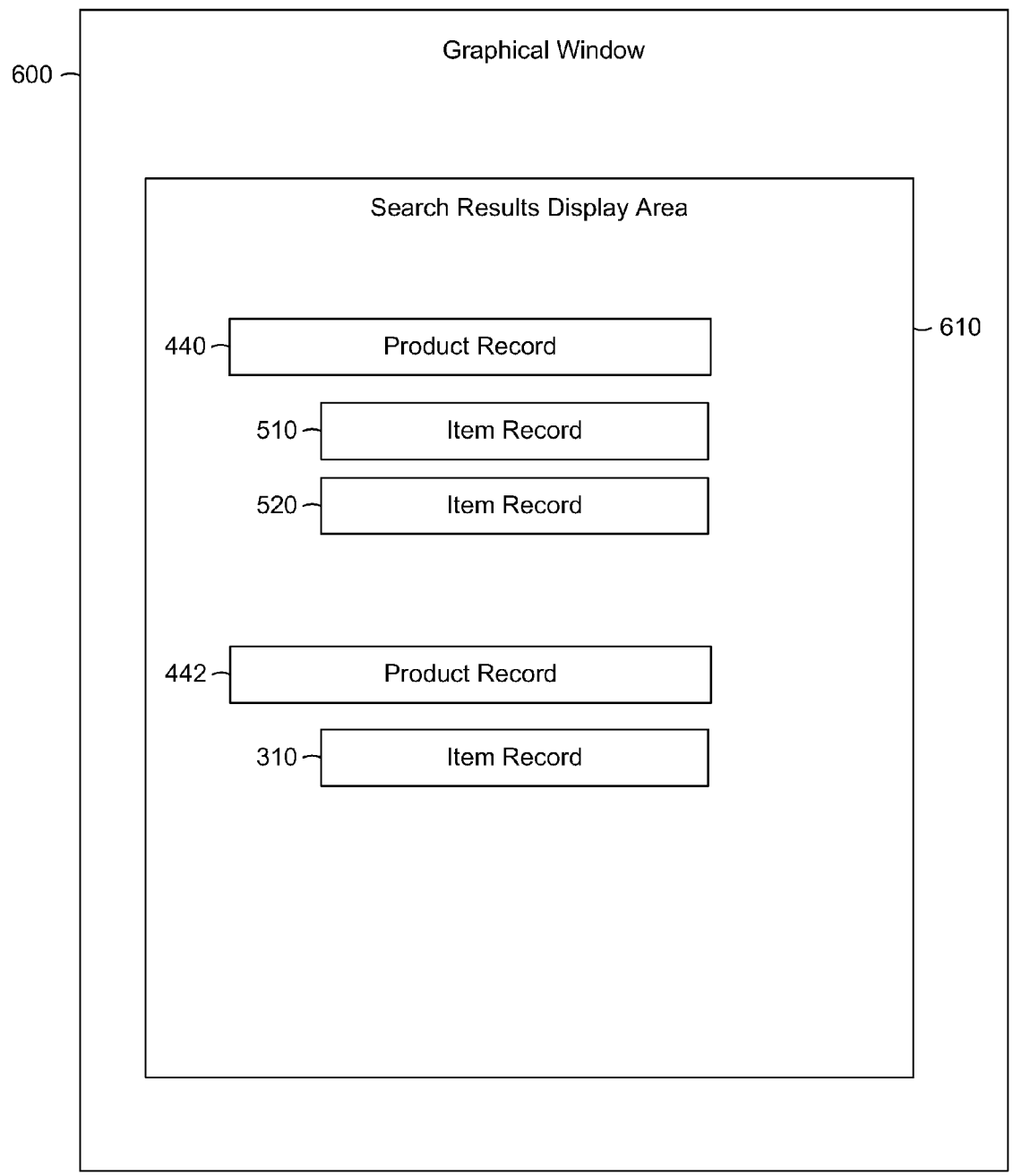
FIGS. 6-7 are diagrams illustrating graphical windows that utilize mappings of item records to product records, according to some example embodiments.
Figure 7:
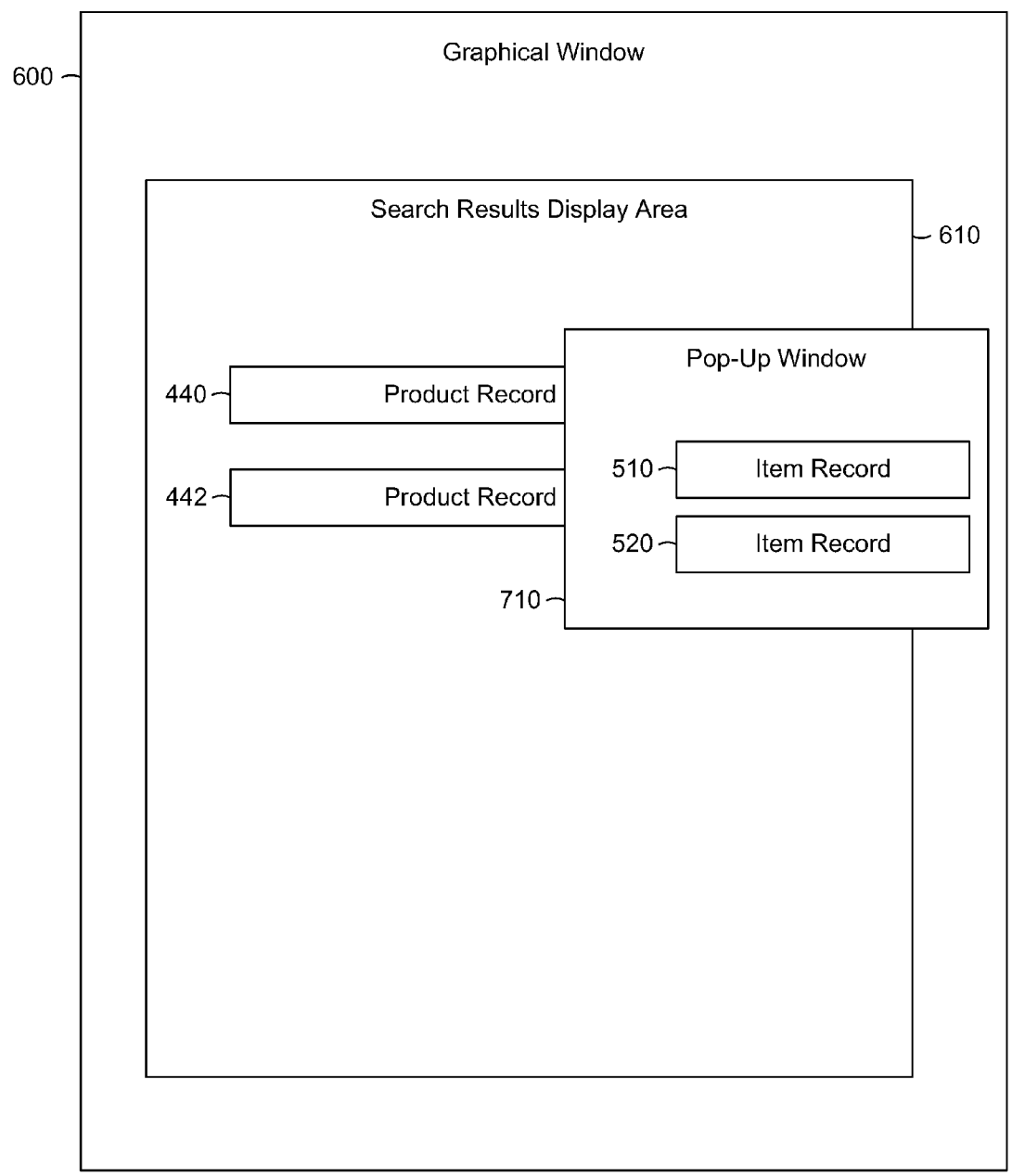

FIGS. 6-7 are diagrams illustrating graphical windows that utilize mappings of item records to product records, according to some example embodiments. A graphical window 600 is generated and presented to a user (e.g., at the user machine 150). The graphical window 600 includes a search results display area 610 that displays results of a search query. As shown, the search results display area 610 is a visually defined portion of the graphical window 600 (e.g., defined by a boundary). In various example embodiments, however, the search results display area 610 may be displayed with any layout (e.g., seamlessly integrated into the graphical window 600).

As shown in FIG. 6, multiple item records 510, 520, and 310 are presented in an arrangement grouped according to their mapped product records 440 and 442. Two item records 510 and 520 are mapped to one product record 440 (see FIG. 5), and the product record 440 is presented as a heading for the item records 510 and 520 in the search results display area 610. A third item record 310 is mapped to another product record 442 (see FIG. 5), and the product record 442 is presented as a heading for that item record 310.

As shown in FIG. 7, the search results display area 610 may be arranged to present initially only the product records 440 and 442. Upon detection of a user-triggered event corresponding to a particular product record 440, (e.g., a mouse over, or a mouse click), the graphical window 600 may display a pop-up window 710 to present the item records 510 and 520 that are mapped to that product record 440. The pop-up window 710 is shown as partially obscuring the search results display area 610, but any arrangement or rearrangement of item records based on their mapped product records may be implemented in the graphical window 600.

Figure 8:
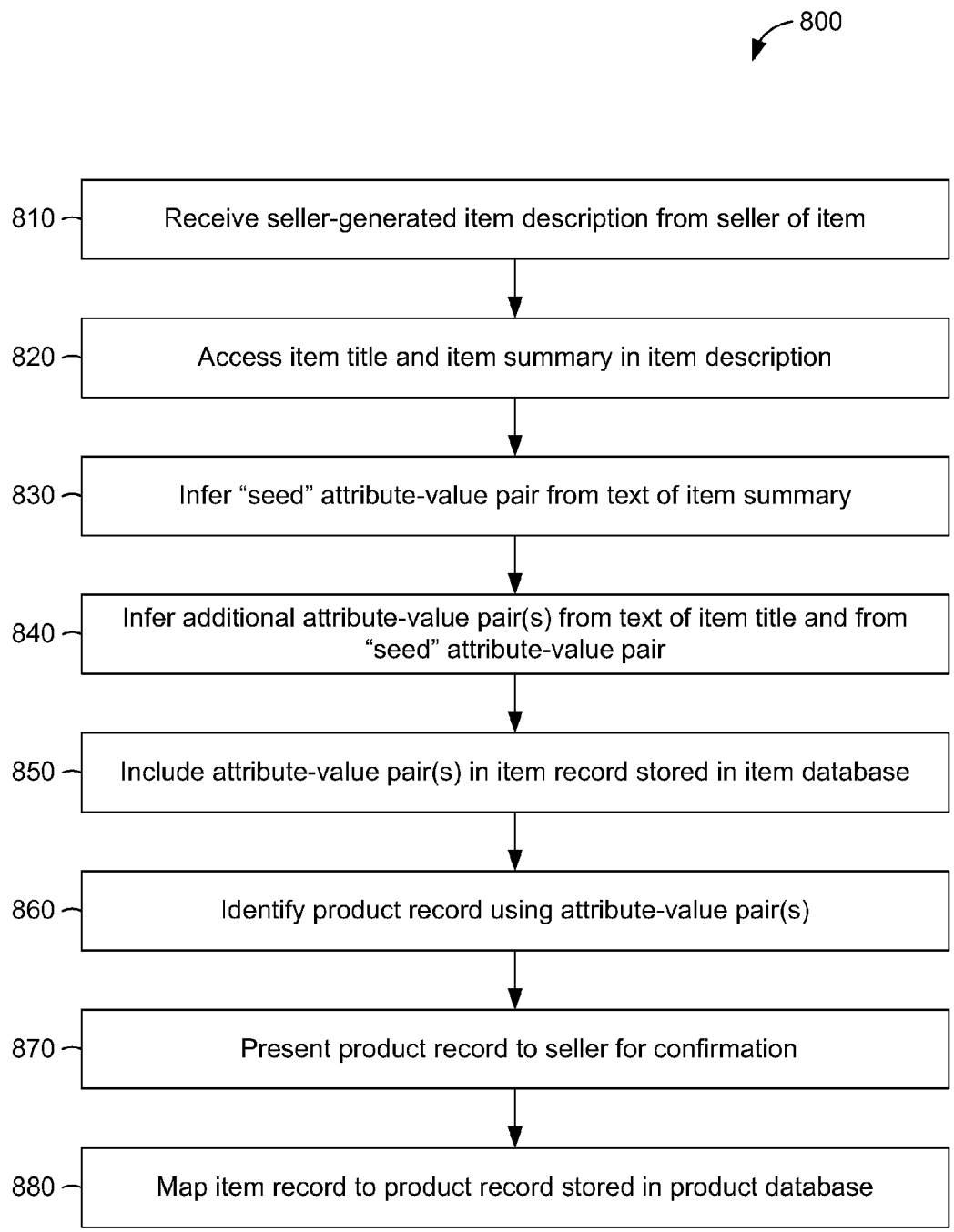
FIGS. 8-9 are flowcharts illustrating a method of mapping an item record to a product record, according to some example embodiments.
Figure 9:
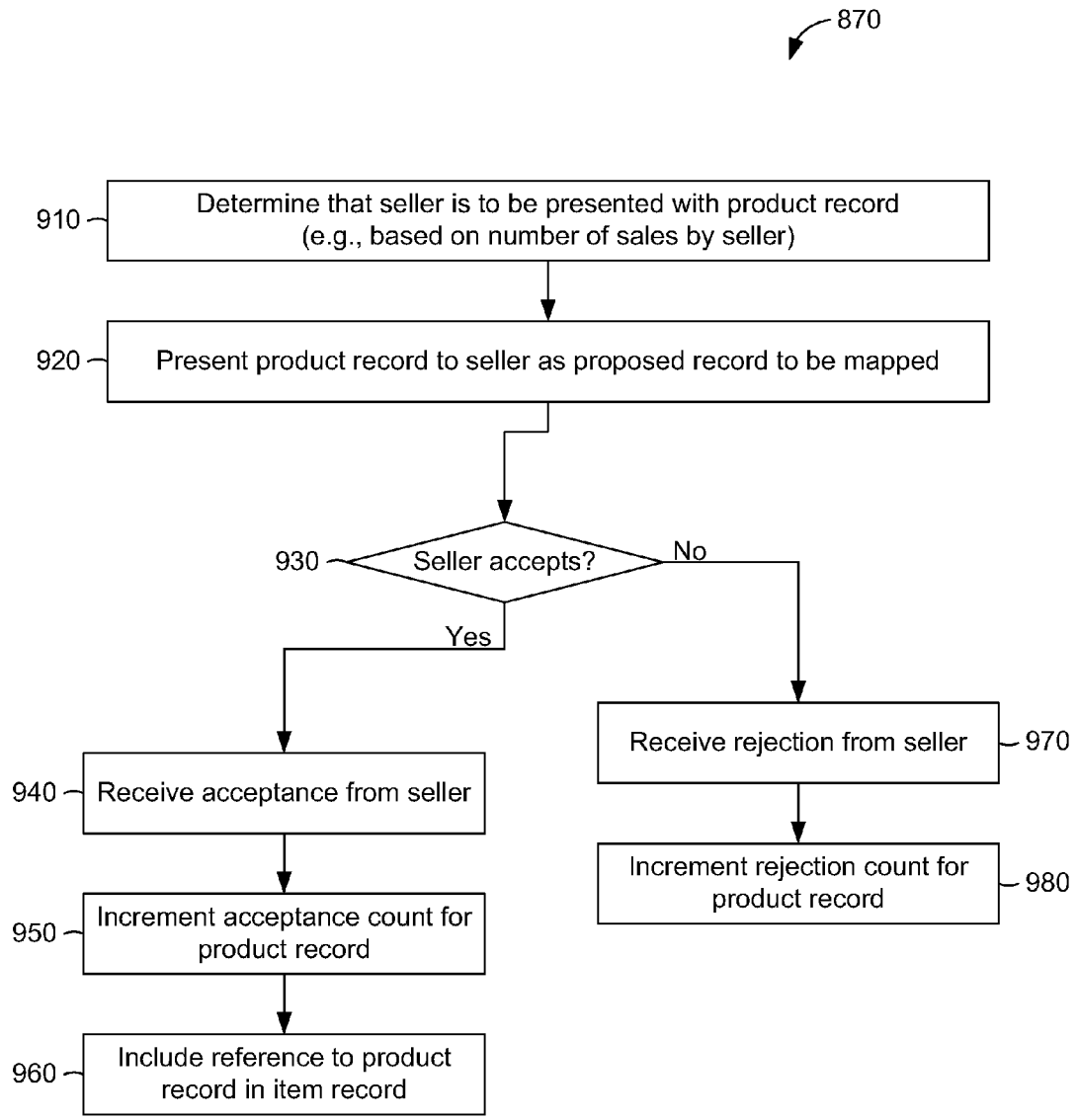

FIGS. 8-9 are flowcharts illustrating operations in a method 800 of mapping an item record to a product record, according to some example embodiments. The method 800 includes operations 810-880.

Operation 810 involves receiving the item description 311 from the seller of the item. The item description 311 is descriptive of the item and may be generated by the seller. For example, the seller may be prompted to submit the title text 322 as the item title 312 and the summary text 323 as the item summary 313, which when taken together, constitute the item description 311 for the item. In some example embodiments, operation 810 is performed by the network interface device 119 of the server machine 110.

Operation 820 involves accessing the item title 312 and the item summary 313. For example, the item description 311 may be stored in the item record 310 within the item database 120. Accessing the item title 312 and the item summary 313 is performed by accessing the item record 310 in the item database 120. As another example, the item description 311 may be stored in a memory of a computer system, and accessing the item title 312 and the item summary 313 involves reading the memory. In some example embodiments, operation 820 is performed by the analysis module 111 of the server machine 110.

Operation 830 involves inferring a "seed" attribute-value pair (e.g., attribute-value pair 315) from the item description 311. More specifically, the seed pair may be inferred from the summary text 323 of the item summary 313. By repeating operation 830, multiple seed pairs may be inferred, and a seed list of attributes and values may be created. In some example embodiments, operation 830 is performed by the analysis module 111 of the server machine 110.

Operation 840 involves inferring an additional attribute-value pair (e.g., attribute-value pair 317) from the item description 311. More specifically, the additional pair may be inferred from the title text 322 of the item title 312. In some example embodiments, this additional inferring is based on the seed attribute-value pair (e.g., attribute-value pair 315) inferred in operation 330. For example, because a seed attribute value pair inferred from the summary text 323 is likely to be repeated in the title text 322, operation 840 may search for an occurrence in the title text 322 of the attribute value (e.g., attribute value 326) of the seed pair, which was inferred from the summary text 323. As another example, machine learning techniques may infer the additional pair based on contextual relationships identified in the summary text 323. Machine learning techniques are discussed in further detail below with respect to FIG. 12.

Moreover, multiple seed attribute-value pairs (e.g., from a seed list) may form the basis for inferring the additional attribute-value pair 317. By repeating operation 840, multiple additional pairs may be inferred. In some example embodiments, operation 840 is performed by the analysis module 111 of the server machine 110.

Operation 850 involves including the inferred attribute-value pairs 315 and 317 in the item record 310. For example, the inferred attribute-value pairs 315 and 317 may be stored in the item description 311 within the item record 310, which is stored in the item database 120. This has the effect of aggregating information about the item in the item record 310. In some example embodiments, operation 850 is performed by the analysis module 111 of the server machine 110.

Operation 860 involves identifying the product record 446 as a product record to which the item record 310 is to be mapped. One or more attribute-value pairs (e.g., pair 315) is used to perform this identification. The identifying of the product record 446 may be based on a comparison of the reference attribute-value pair 447 with an attribute-value pair in the item record 310 (e.g., pair 315). Specifically, this comparison may be between the attribute value 326 and the reference value of the reference attribute-value pair 447. In some example embodiments, operation 860 is performed by the mapping module 113 of the server machine 110.

Additionally, operation 860 may involve identifying the product record 446 based on analysis of one or more attribute values (e.g., attribute value 326) using a decision tree (e.g., decision tree 400). For example, the comparison between the attribute value 326 of the item record 310 and the reference value of the reference attribute-value pair 447 may be the result of traversing a path from the decision tree root node 410 to the product record 446 (e.g., end node 446) via branch nodes 424 and 434. In some example embodiments, the identifying of the product record 446 is performed by the mapping module 113.

Operation 870 involves presenting the product record 446 to the seller for confirmation that the item record 310 is to be mapped to the product record 446. In some example embodiments, operation 870 is performed by the mapping module 113 of the server machine 110. This has the effect of presenting the product record 446 as a proposed record to be mapped as corresponding to the item record 310. Not every seller necessarily must be presented with such a proposal. For example, a seller known to deliberately select incorrect or inappropriate mappings may be skipped for the purposes of operation 870. According to some example embodiments, the presenting of the product record 446 may be based on a number of sales corresponding to the seller. For example, a high-volume seller with many previous sales transactions may be deemed a good candidate to confirm proposed mappings, which may be used to improve identification of product records in future proposals. In some example embodiments, data from repeated instances of operation 870 (e.g., a count of acceptances of proposed mappings, or a count of rejections of proposed mappings) may be used to improve the product database 130 (e.g., add or remove nodes from decision tree 400). Further details of operation 870 are discussed below with respect to FIG. 9.

Operation 880 involves mapping the item record 310 to the product record 446. The mapping is performed, in some example embodiments, by including the reference 319 in the item record 310. As noted above, the reference 319 may be a pointer, locator, or an identifier corresponding to the product record 446, and the product record 446 may contain a corresponding reference back to the item record 310. In some example embodiments, operation 880 is performed by the mapping module 113 of the server machine 110.

As shown in FIG. 9, operation 870 includes operations 910-980. In some example embodiments, operation 870 is performed by the mapping module 113 of the server machine 110. Hence, in some example embodiments, operations 910-980 are performed by the mapping module 113.

Operation 910 involves determining that the seller is to be presented with the product record 446. As discussed above, this determination may be based on a number of sales transacted by the seller.

Operation 920 involves presenting the product record 446 to the seller as a proposed record to be mapped to the item record 310. At operation 930, if the seller accepts the proposal, operations 940-960 are performed, but if the seller rejects the proposal, operations 970 and 980 are performed.

In a situation where the seller has accepted the proposal, operation 940 involves receiving the acceptance from the seller. Operation 950 involves incrementing an acceptance count for the product record 446. This has the effect of aggregating confirmation data with respect to acceptances of proposed mappings, which may be used to improve identification of product records in future proposals, as discussed above. Operation 960 involves including the reference 319 to the product record 446 in the item record 310. This has the effect of storing the mapping of the item record 310 to the product record 446.

In a situation where the seller has rejected the proposal, operation 970 involves receiving a rejection from the seller. Operation 980 involves incrementing a rejection count for the product record 446 proposed to be mapped to the item record 310. This has the effect of aggregating information data with respect to rejections of proposed mappings, which may be used to improve identification of product records in future proposals, as discussed above.

Figure 10:
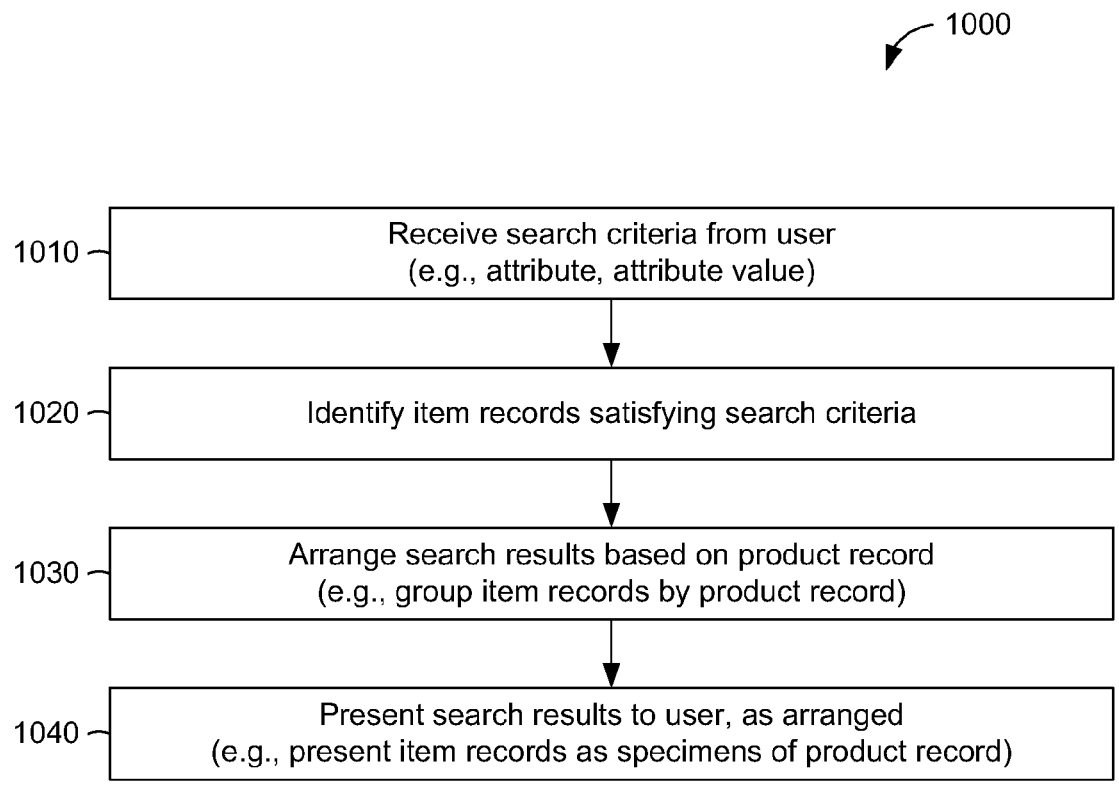
FIGS. 10-11 are flowcharts illustrating a method of using a mapping of an item record to a product record, according to some example embodiments.

FIG. 10 is a flow chart illustrating operations in a method 1000 of using a mapping of the item record 310 to the product record 446, according to some example embodiments. The method 1000 includes operations 1010-1040.

Operation 1010 involves receiving search criteria from a user. The user may be a user of the user machine 150, and the search criteria received may be, for example, an attribute, an attribute value, or any combination thereof. As an example, operation 1010 may receive the phrase "15.1 Megapixel" as the search criteria (e.g., via a search interface presented using the user machine 150). In some example embodiments, operation 1010 is performed by the search module 117 of the server machine 110.

Operation 1020 involves identifying one or more item records (e.g., item records 510 and 520) that satisfy the search criteria received in operation 1010. In some example embodiments, operation 1020 is performed by the search module 117 of the server machine 110. The search module 117 may implement any search engine to perform this operation. In certain example embodiments, the search module 117 communicates with an external search engine via the network interface device 119 to perform this operation. The identified item records are the results of the search, as returned by the search engine, and constitute search results.

Operation 1030 involves arranging the search results (e.g., the item records 510 and 520) based on a product record (e.g., product record 440) to which the search results (being item records) are mapped. According to some example embodiments, this involves grouping item records by product record, as shown in FIGS. 6-7. In some example embodiments, operation 1030 is performed by the search module 117 of the server machine 110.

Operation 1040 involves presenting the search results (e.g., item records 510 and 520) to the user, as arranged in operation 1030. The arrangements may present the item records as specimens of the product record. For example, as shown in FIGS. 6-7, the product record 440 may be displayed as a heading, category, abstraction, parent node, or any combination thereof, of the item records 510 and 520. In some example embodiments, operation 1040 is performed by the search module 117 of the server machine 110.

Figure 11:
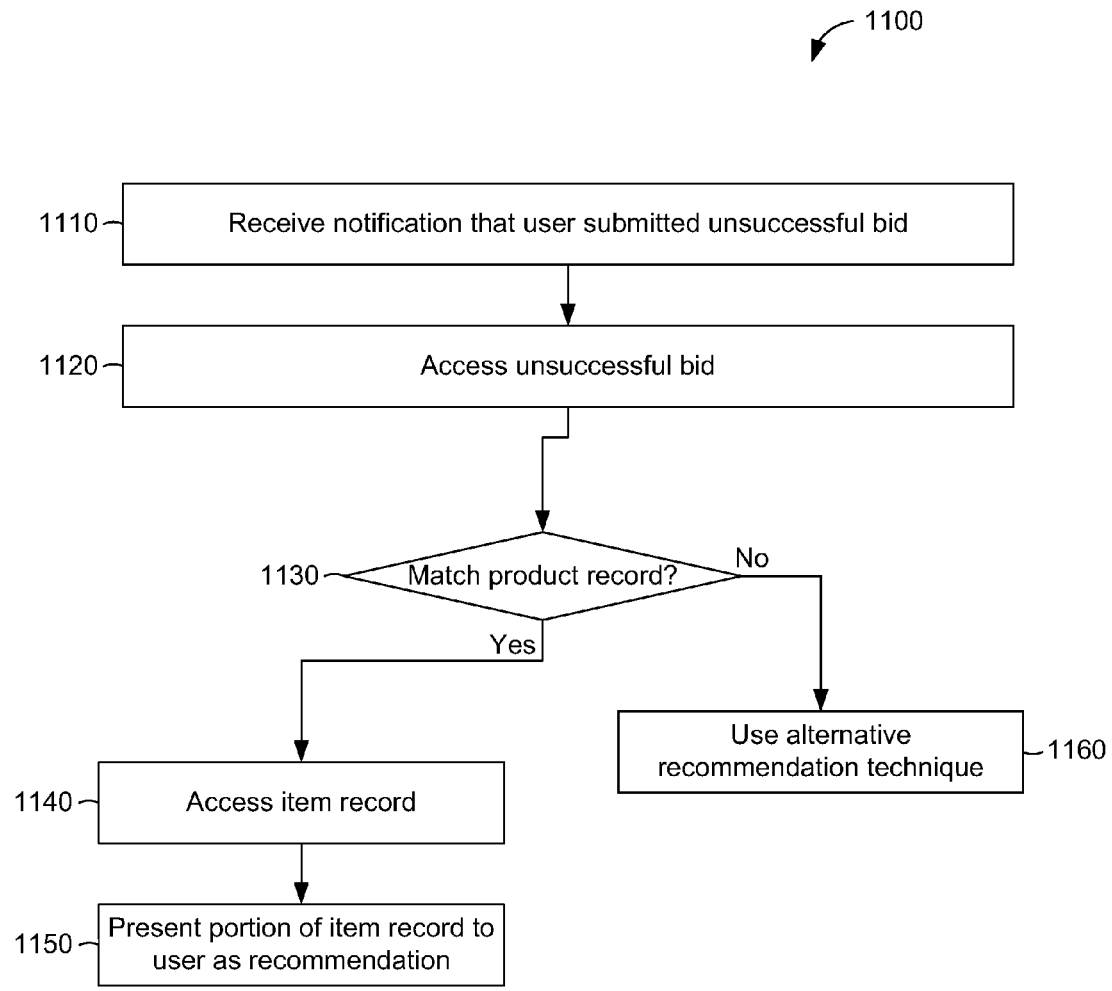

FIG. 11 is a flow chart illustrating operations in a method 1100 of using a mapping of the item record 310 to the product record 446, according to some example embodiments. The method 1100 includes operations 1110-1160. In some example embodiments, operations 1110-1160 are performed by the analysis module 111 of the server machine 110.

Operation 1110 involves receiving a notification that the user has submitted an unsuccessful bid to purchase some item (e.g., an item recently sold at an auction). Operation 1120 involves accessing the unsuccessful bid (e.g., accessing a data storage unit, or accessing a computer memory) to read an attribute-value pair corresponding to the item of the unsuccessful bid. For example, the item recently sold at the auction may have its own item record, with several attribute-value pairs stored therein. This item record may be accessed to read the attribute-value pairs.

At operation 1130, if an attribute-value pair of the item matches a reference attribute-value pair (e.g., reference attribute-value pair 447) of a product record (e.g., product record 446), operations 1140-1150 are performed, but if there is no match, operation 1160 is performed. In some example embodiments, an exact match is not required, and the use of fuzzy logic techniques enables near matches to be used for the same purpose.

In a situation where a match is found, operation 1140 involves accessing the item record 310 corresponding to the product record 446 (e.g., by accessing the item database 120). Operation 1150 involves presenting at least a portion of the item record 310 to the user as a recommendation (e.g., a recommended substitute item comparable to the subject of the unsuccessful bid).

In a situation where no match is found, operation 1160 involves using an alternative recommendation technique. Any alternative recommendation methodology may be used here.

Figure 12:
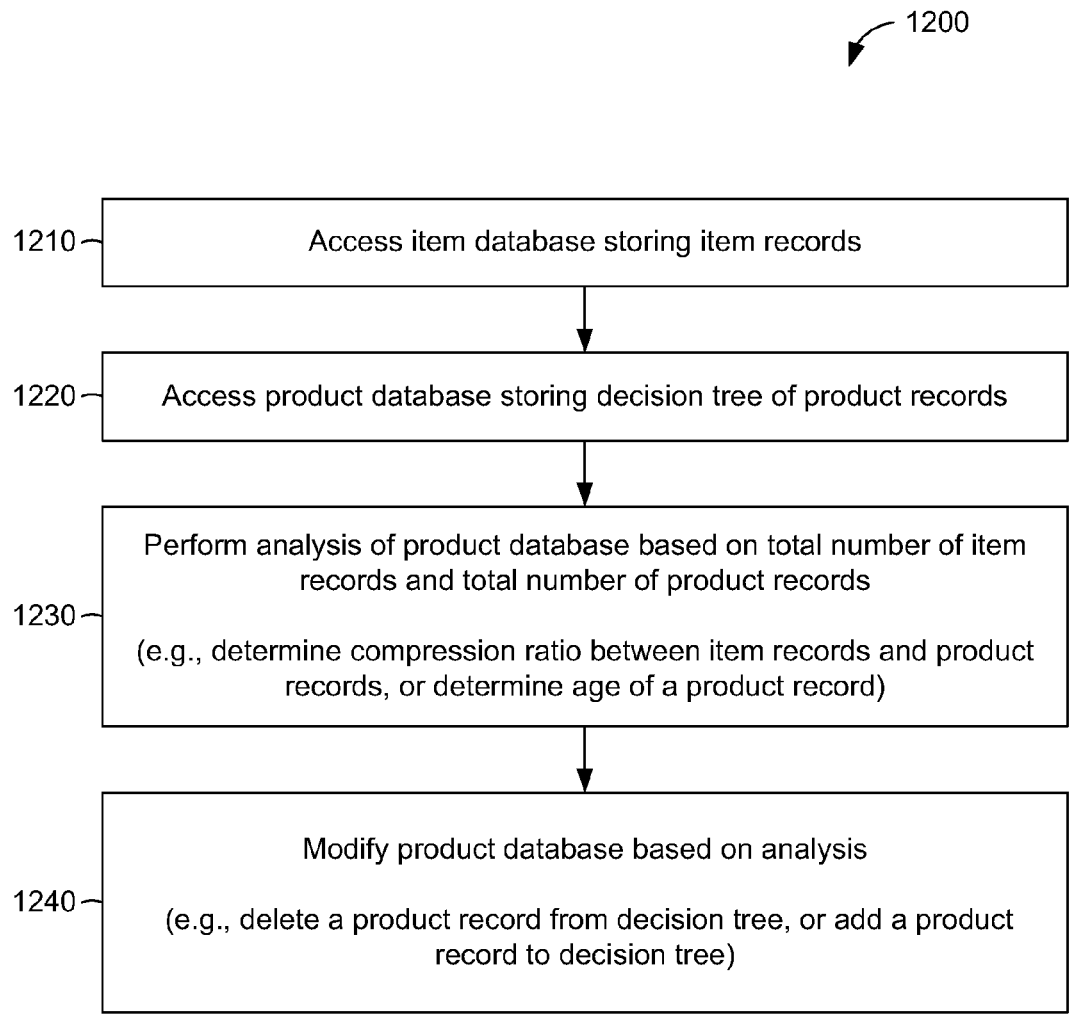
FIG. 12 is a flowchart illustrating a method of modifying a product database, according to some example embodiments.

FIG. 12 is a flow chart illustrating operations in a method 1200 of modifying the product database 130, according to some example embodiments. The method 1200 includes operations 1210-1240. In some example embodiments, operations 1210-1240 are performed by the manager module 115 of the server machine 110.

Operation 1210 involves accessing the item database 120, which stores item records 310, 510, and 520. Operation 1220 involves accessing the product database 130, which stores the decision tree 400 of product records 440, 442, and 444.

Operation 1230 involves performing an analysis of the product database 130 based on a total number of item records in the item database 120 and a total number of product records in the product database 130. For example, the item database 120 may represent a large inventory of items available for sale (e.g., on an online auction website), and aggregating this large inventory of items into a smaller catalog of products facilitates searches for items by various users. Accordingly, mapping various items to their corresponding products may be considered as a compression operation that compresses the item inventory into a more manageable product catalog. An analysis of the degree of compression achieved by these mappings may be used to improve the product database for future mappings. In some example embodiments, the performance of this analysis includes determining a compression ratio between the total number of item records and the total number of product records.

The analysis performed in operation 1230 may further involve determining an age of a product record (e.g., product record 440), a number of item records mapped to the product record, a frequency of item records being mapped to the product record, or any combination thereof. This has the effect of analyzing whether the product record is becoming, or has become, obsolete and accordingly a good candidate for deletion from the product database 130. Similarly, it may be determined that a product record is so heavily mapped that its mappings should be subdivided among multiple new product records added to the product database 130.

In some example embodiments, a software classifier is trained by the manager module 115 to perform supervised machine learning and accordingly learn whether a particular value is appropriate for pairing with a particular attribute. The classifier may be trained using positive examples, in which the value is positively correlated with the attribute. For example, a positive example may train the classifier to recognize that a value of "Sony" is valid for an attribute of "brand." The classifier may also be trained using negative examples, in which the value is negatively correlated with the attribute. As an example, the classifier may be trained to recognize that a value of "camera" is probably not valid for an attribute of "brand." The software classifier is trained to recognize positional correlations, syntactic correlations, sequential correlations, linguistic correlations, semantic correlations, or any combination thereof, among tokens (e.g., words, or alphanumeric character combinations) within the item description 311 (e.g., character combinations within the summary text 323).

After being trained with a number of examples, the classifier generates a predictive model (e.g., a hypothesis) to be used when the classifier is presented with an unknown token (e.g., a new word, or a new alphanumeric character combination). Using the predictive model, the classifier determines whether the unknown token is a valid attribute value of a particular attribute. For example, if the classifier has learned that "Sony," "Nikon," and "Canon" are valid attribute values for the attribute of "brand," as tokens that frequently precede the phrase "digital camera" in an item description (e.g., item description 311), the classifier may generate a predictive model that determines "Panasonic" as likely to be an additional valid attribute value for "brand." However, the word "camera" is not predicted as a likely valid attribute value, based on the classifier learning that "camera" is a token that itself occurs within the phrase "digital camera."

The analysis performed in operation 1230 may include, according to certain example embodiments, presenting a seller with a proposed record to be added to, or deleted from, the product database 130. Similar to the proposal confirmation methodologies described above, the seller may be presented with the proposed record based a history of selecting correct or appropriate mappings between items and products. The seller may be presented with the proposed record based on a number of sales corresponding to the seller. For example, a high-volume seller with many previous sales transactions may be deemed a good candidate to confirm proposed additions or deletions from the product database 130.

Operation 1240 involves modifying the product database 130 based on the analysis performed in operation 1230. As noted above, modification of the product database may include adding a product record, deleting a product record, or any combination thereof. For example, operation 1240 may involve adding an end node (e.g., end node 442) to the decision tree 400, deleting an end node from the decision tree 400, or any combination thereof. As a further example, a subdivision of an existing end node may involve editing the existing end node (e.g., to reduce its scope) and adding a new end node to the parent branch node (e.g., branch node 430) of the existing end node.

The methodologies discussed herein may facilitate searches for items by users, where a large number of item descriptions (e.g., item description 311) are generated by a large number of sellers of the items and where the users are primarily interested in searching for an item as a specimen of a product. By mapping item records to product records, searches for items are more likely to return results that represent actual specimens of the products of interest. This may have the effect of improving user experiences in searching for items, seller experiences in selling items, marketplace efficiency in matching sellers and users as potential buyers, or any combination thereof. Furthermore this may have the effect of reducing network traffic by reducing transmissions of search results that do not represent actual specimens of the products of interest.

The methodologies discussed herein may further result in a compression effect from using a relatively small number of product records (e.g., product record 446) to facilitate searches of a relatively large number of seller-generated item descriptions (e.g., item description 311). This compression effect may improve search efficiency and may have further effects that include, but are not limited to, a reduction in usage of computing resources to perform item searches, a reduction in thermal pollution generated by the computing resources, a reduction in noise pollution from the computing resources, or any combination thereof.

Figure 13:
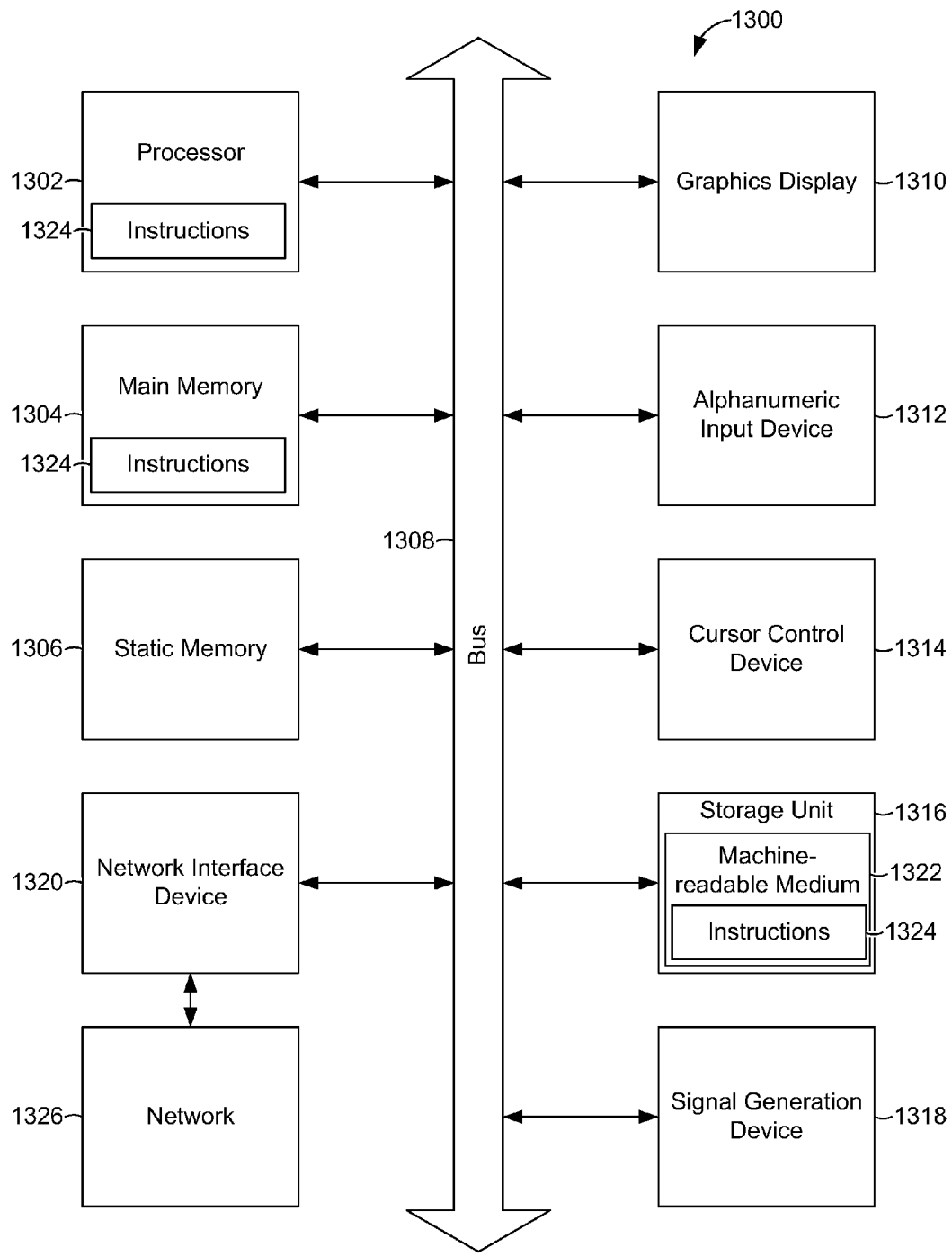
FIG. 13 is a block diagram illustrating components of a machine, according to some example embodiments, able to read instructions from a machine-readable medium and perform any one or more of the methodologies discussed herein.

FIG. 13 illustrates components of a machine, according to some example embodiments, able to read instructions from a machine-readable medium and perform any one or more of the methodologies discussed herein. Specifically, FIG. 13 shows a diagrammatic representation of a machine in the example form of a computer system 1300 and within which instructions 1324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include a collection of machines that individually or jointly execute instructions 1324 to perform any one or more of the methodologies discussed herein.

The computer system 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any combination thereof), a main memory 1304, and a static memory 1306, which communicate with each other via a bus 1308. The computer system 1300 may further include a graphics display 1310 (e.g., a plasma display panel (PDP), a liquid crystal display (LCD), a projector, or a cathode ray tube (CRT)). The computer system 1300 may also include an alphanumeric input device 1312 (e.g., a keyboard), a cursor control device 1314 (e.g., a mouse, a touchpad, a trackball, a joystick, a motion sensor, or other pointing instrument), a storage unit 1316, a signal generation device 1318 (e.g., a speaker), and a network interface device 1320.

The storage unit 1316 includes a machine-readable medium 1322 on which is stored instructions 1324 (e.g., software) embodying any one or more of the methodologies or functions described herein. The instructions 1324 may also reside, completely or at least partially, within the main memory 1304, within the processor 1302 (e.g., within the processor's cache memory), or both, during execution thereof by the computer system 1300, the main memory 1304 and the processor 1302 also constituting machine-readable media. The instructions 1324 may be transmitted or received over a network 1326 via the network interface device 1320.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., software) for execution by the machine and that cause the machine to perform any one or more of the methodologies described herein. The term "machine-readable medium" shall accordingly be taken to include, but not be limited to, a data repository in the form of a solid-state memory, an optical medium, a magnetic medium, or any combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
   accessing a seller-generated item description received from a seller of an item, the item description being descriptive of the item;
   inferring an attribute and an attribute value based on the item description, the inferring being performed by a hardware-implemented analysis module of a machine;
   including the attribute and the attribute value in an item record for the item, the item record being stored in an item database;
   presenting a product record stored in a product database to the seller as a proposed record to be mapped to the item record;
   receiving an acceptance of the proposed record from the seller;
   incrementing an acceptance count corresponding to the product record; and
   mapping the item record to the product record by including a reference to the product record in the item record, the mapping being performed by a hardware-implemented mapping module of the machine using the attribute value.

2. The computer-implemented method of claim 1, further comprising:
   receiving search criteria from a user, the search criteria including the attribute value;
   identifying a plurality of item records satisfying the search criteria;
   presenting the plurality of item records to the user, the plurality of item records being arranged using the product record.

3. The computer-implemented method of claim 1, wherein:
   the item description is textual and comprises an item title and an item summary;
   the attribute is a first attribute, and the attribute value is a first attribute value; and
   the inferring of the first attribute and first attribute value is based on the item summary;
   the method further comprising:
   inferring a second attribute and a second attribute value based on the item title.

4. The computer-implemented method of claim 3, wherein:
   the inferring of the second attribute value is further based on the first attribute value.

5. The computer-implemented method of claim 1, wherein:
   the product record includes the attribute and a reference value; the method further comprising:
   identifying the product record by comparing the reference value to the attribute value.

6. The computer-implemented method of claim 1, further comprising:
   performing an analysis of the attribute value using a decision tree; and
   identifying the product record based on the analysis.

7. The computer-implemented method of claim 1, further comprising:
   determining that the seller is to be presented with the product record.

8. The computer-implemented method of claim 7, wherein:
   the determining is based on a number of sales corresponding to the seller.

9. The computer-implemented method of claim 1, further comprising:
   accessing an unsuccessful auction bid submitted by a user, the unsuccessful auction bid corresponding to the product record; and
   presenting at least a portion of the item record to the user as a recommendation.

10. A system comprising:
    an item database;
    a hardware-implemented analysis module communicatively coupled to the item database, the analysis module being configured to:
       access a seller-generated item description received from a seller of an item, the item description being descriptive of the item;
       infer an attribute and an attribute value based on the item description; and
       include the attribute and the attribute value in an item record for the item, the item record being stored in an item database; and
    a hardware-implemented mapping module communicatively coupled to the item database, the mapping module being configured to:
       present a product record stored in a product database to the seller as a proposed record to be mapped to the item record;
       receive an acceptance of the proposed record from the seller;
       increment an acceptance count corresponding to the product record; and
       map the item record to the product record by including a reference to the product record in the item record based on the attribute and on the attribute value.

11. The system of claim 10, further comprising:
    a search module communicatively coupled to the item database, the search module to:
       receive search criteria from a user, the search criteria including the attribute value;
       identify a plurality of item records satisfying search criteria;
       present the plurality of item records to the user as specimens of the product record.

12. The system of claim 10, wherein:
    the item description is textual and comprises an item title and an item summary;
    the attribute is a first attribute, and the attribute value is a first attribute value; and
    the analysis module is to:
       infer the first attribute and the first attribute value based on the item summary; and
       infer a second attribute and a second attribute value based on the item title and on the first attribute value.

13. The system of claim 10, wherein:
    the product database is representative of a decision tree having a plurality of end nodes;

the product record represents one of the plurality of end nodes and includes the attribute and a reference value; and the mapping module is to identify the product record by comparing the reference value to the attribute value.

14. A computer-implemented method comprising:

accessing an item database storing item records, each of the item records including an attribute, an attribute value, and a reference to a product record of a plurality of product records;

accessing a product database storing the plurality of product records, the product database being representative of a decision tree having end nodes, each of the end nodes corresponding uniquely to one of the plurality of product records;

performing an analysis of the product database based on the item records and on the plurality of product records, the analysis including a determination of a compression ratio based on a first total number of item records and on a second total number of product records, the analysis being performed by a hardware-implemented manager module of a machine;

modifying the product database based on the analysis, the modifying being performed by the hardware-implemented manager module of the machine.

15. The computer-implemented method of claim 14, wherein:

the performing of the analysis includes presenting a proposed record to be added to the plurality of product records, the presenting being to a seller and based on a number of sales corresponding to the seller.

16. The computer-implemented method of claim 14, wherein:

the performing of the analysis includes determining an age of one of the plurality of product records.

17. The computer-implemented method of claim 14, wherein:

the modifying of the product database comprises deleting an end node from the decision tree.

18. The computer-implemented method of claim 14, wherein:

the modifying of the product database comprises adding an end node to the decision tree.

19. A non-transitory machine-readable storage medium comprising instructions that, when executed by one or more processors of a machine, cause the machine to perform operations comprising:

accessing a seller-generated item description received from a seller of an item, the item description being descriptive of the item;

inferring an attribute and an attribute value based on the item description;

including the attribute and the attribute value in an item record for the item, the item record being stored in an item database;

presenting a product record stored in a product database to the seller as a proposed record to be mapped to the item record;

receiving an acceptance of the proposed record from the seller;

incrementing an acceptance count corresponding to the product record; and mapping the item record to the product record by including a reference to the product record in the item record, the mapping being based on the attribute and on the attribute value.

* * * * *